United States Patent [19]

Kensinger et al.

[11] Patent Number: 4,473,183
[45] Date of Patent: Sep. 25, 1984

[54] TEMPERATURE DEPENDENT DUTY CYCLER CONTROL SYSTEM

[75] Inventors: Robert A. Kensinger, Rockford, Ill.; James R. Herdeman, Minnetonka, Minn.

[73] Assignee: Honeywell Inc., Minneapolis, Minn.

[21] Appl. No.: 434,993

[22] Filed: Oct. 18, 1982

[51] Int. Cl.³ .................. G05D 23/00; F23N 5/20
[52] U.S. Cl. .................... 236/46 R; 165/12
[58] Field of Search .................. 236/46 R; 165/12; 307/39, 41

[56] References Cited

U.S. PATENT DOCUMENTS 4,199,023  4/1980  Phillips ................ 165/12
4,333,519  6/1982  Shafrir et al. ............ 165/12

Primary Examiner—William E. Wayner
Attorney, Agent, or Firm—Charles L. Rubow

[57] ABSTRACT

The invention disclosed herein is a temperature dependent duty cycler control system which provides a duty cycle off time locus responsive to a sensed temperature and is characterized by two selectable off time periods which are connected by slope controllable ramping functions. The system also includes means for coordinating operation of several heating and/or cooling units by making real time determinations of the most efficient average number of units which should be running at a given time and by maintaining a priority order of rotation of the units available to be shed.

6 Claims, 7 Drawing Figures

TEMPERATURE DEPENDENT DUTY CYCLER CONTROL SYSTEM

BACKGROUND OF THE INVENTION

The invention disclosed herein relates generally to energy management apparatus and methods, and more particularly to a system for controlling equipment operation according to a duty cycle which varies continuously with variations in a sensed condition, such as temperature, within a range of sensed condition values.

Heating and air conditioning equipment for large buildings consume substantial amounts of electrical energy. Over the years various duty cycling systems have been developed wherein, in each case, equipment is periodically turned on and off in accordance with some plan which is directed to more efficient operation with as little effect on the occupants and contents of the building as possible. The purpose of duty cycle control is thus to reduce operation time of controlled equipment without loss of desired control. Reduced operation time is possible with duty cycle control without accompanying disadvantages because the controlled equipment is used at a higher efficiency.

For temperature control equipment systems, heating and cooling operation time is a function of temperature. Duty cycling based on temperature compensates for reduced load under moderate temperatures and heavy loads under extreme temperatures. Some duty cycling systems involve periods or cycles having fixed lengths of time, such as five or ten minutes, for example, with the off times being represented as lesser lengths of time or percentages of the periods or cycles. These are referred to as duty cycling schemes which involve fixed period duty cycles with varying off times.

SUMMARY OF THE INVENTION

The duty cycler control system of the present invention, in part, operates according to a program referred to herein for convenience as DUTYCYC. DUTYCYC includes two main program routines which are (1) a shed time determination scheme referred to herein as SHDTYM for determining shed times which vary in accordance with changes in temperature and (2) a predictive shed scheme referred to herein as PREDIK for balancing the sequencing of shed loads.

SHDTYM involves a determination of shed times based on sensed input temperatures and a user program comprising four reference or benchmark temperature selections and two load shed time (OFF LONG and OFF SHORT) selections. The SHDTYM scheme provides dual ramping functions for varying heating and cooling equipment shed times, and has the advantage of flexibility from the standpoint that the user may choose any desired shed period for any desired temperature within the range of operation of the system by choosing appropriate benchmark temperatures and off times.

In the application of the SHDTYM scheme different types of heating and cooling equipment may be easily controlled. Heat pumps, for example, may be controlled according to a dual slope ramp to provide both heating and cooling without the need for seasonal reprogramming. Resistive strip heaters may be cycled to provide down to zero on time, and to provide on time controlled precisely according to a temperature dependent ramp. Likewise, two stage twin compressor systems with minimum allowable on times may be controlled by programming an appropriate ramp function.

The predictive shed scheme PREDIK involves the specific sequencing of the shedding of loads. The SHDTYM scheme referred to above relates to determining shed times on a single load basis, but not timing or sequencing of the initiation of the shed time of one load relative to initiation of the shed times of other loads the system. The predictive shed scheme PREDIK is directed to high efficiency balancing of the shed times so that a substantially constant power use is achieved for the system as a whole despite the inherent intermittent operation of individual loads controlled by the system.

A main object of the present invention is to provide a new and improved duty cycler control system (DUTCYC) for controlling heating and air conditioning equipment for large and small buildings.

Another object of the invention is to provide a new and improved shed time determination scheme (SHDTYM) involving ramping functions for varying heating and cooling equipment shed times.

Another object of the invention is to provide a new and improved predictive shedding process (PREDIK) for sequencing the shedding of loads by duty cycling equipment which results in the efficient balancing of the shed times.

Other objects of the invention will become apparent from the following specificaion, drawings and appended claims.

DESCRIPTION OF THE PREFERRED EMBODIMENT

Figure 1:
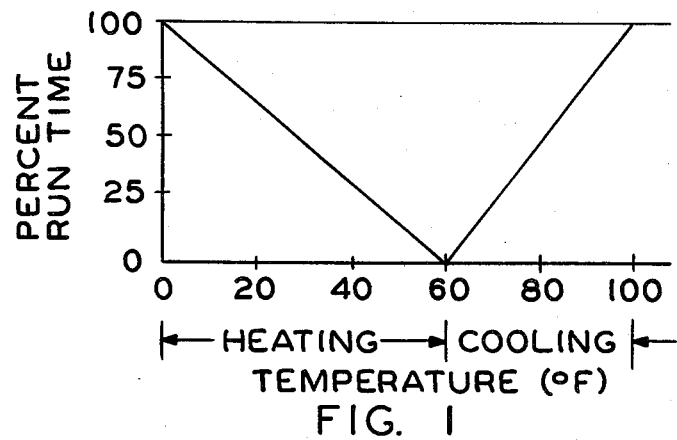
FIG. 1 is an idealized plot of equipment operation vs. temperature which is sought to be simulated by the SHDTYM scheme of the present invention.

Referring to the general concept of the invention, FIG. 1 shows a graph of equipment run time vs. temperature having a negative heating slope terminating at 60° F. and a positive cooling slope originating at 60° F. The graph illustrates an ideal ramping operation where the equipment run time is modulated on a straight line basis between full on time and full off time operation. In this example the balance point of the building, which is the point where neither heating or cooling is required, is 60° F. The balance point could differ from 60° F. depending on the type of building structure or application involved, and, as a practical matter, might be anywhere in the range of 55° F. to 65° F. for example. The duty cycling scheme described herein is easily adapted to any building by the proper selection of temperature parameters as will be described. The SHDTYM scheme in essence is directed to tracking the graph FIG. 1 as closely as possible for each unit of controlled equipment. SHDTYM provides for shedding electrical loads based on four selected benchmark temperatures which cover or define a range of indoor or outdoor temperatures over which the equipment operates.

The SHDTYM routine is applicable to each unit of heating and/or cooling equipment on an individualized basis, whereas the DUTYCYC program through the PREDIK routine coordinates control of a number of heating and/or cooling units operating in unison over temperature ranges which require heating and cooling respectively at opposite ends thereof.

Figure 2:
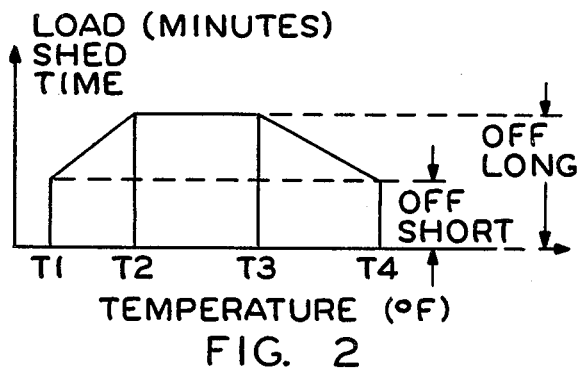
FIGS. 2 to 6 show duty cycle graphs of the SHDTYM scheme as applied to different equipment uses thereof.

The most general form of the SHDTYM scheme is illustrated in FIG. 2 in which the abscissa values represent indoor or outdoor temperatures and the ordinate values, which will be referred to more in detail further on, represent load shed times which conveniently or normally will be in terms of minutes. The SHDTYM scheme allows dual ramps with one ramp having a positve or zero slope between selected temperatures T1 and T2 and the other ramp having a negative or zero slope between selected temperatures T3 and T4. The scheme has the constraints that $T1 \leq T2 \leq T3 \leq T4$. Equipment constraints might limit the range T1 to T4 to $-30$ degrees to $+127$ degrees, C or F, for example.

The control routine for the SHDTYM scheme may involve, for each load, the selection of seven parameters by the user which are the benchmark temperatures T1 to T4, a period for the duty cycle, and two shed times termed OFF LONG and OFF SHORT. By way of example, the duty cycle period may be 2 to 99 minutes and the two shed times may be from 0 to 99 minutes with OFF SHORT $\leq$ OFF LONG load shed time at temperatures. OFF LONG is defined as the period between T2 and T3, and OFF SHORT is defined as the load shed time at T1 and T4. Referring to the ordinate of the graph of FIG. 2, it is the actual load shed times (OFF LONG and OFF SHORT) that are indicated, without regard to the duty cycle period.

With the above definitions the user can develop a number of slopes between T1 and T2 and between T3 and T4 without the need for the magnitudes of the slopes to be equal. The calculation of the duty cycle off times between the temperatures T1 and T2 and between temperatures T3 and T4 is given by the following equations:

OFFTIME $(Tx)$ = OFFTIME $(Tna)$ + (OFFTIME $(Tnb)$ − OFFTIME $(Tna))(Tx - Tna)/(Tnb - Tna)$
$Tx$ = input temperature
$Tna \leq Tx \leq Tnb$
OFFTIME $(Tna)$ = OFF SHORT for $T1 \leq Tx \leq T2$;
OFF LONG for $T3 \leq Tx \leq T4$
OFFTIME $(Tnb)$ = OFF SHORT for $T3 \leq Tx \leq T4$;
OFF LONG for $T1 \leq Tx \leq T2$ Stated otherwise, if Tx is between T1 and T2, OFFTIME (Tna) is the load shed interval at temperature T1 and OFFTIME (Tnb) is the load shed interval at temperature T2. If Tx is between T3 and T4, OFFTIME (Tna) is the load shed inteval at temperature T3 and OFFTIME (Tnb) is the load shed interval at temperature T4.

Other features of the invention are illustrated by the special cases shown in FIGS. 3 to 6.

Figure 3:
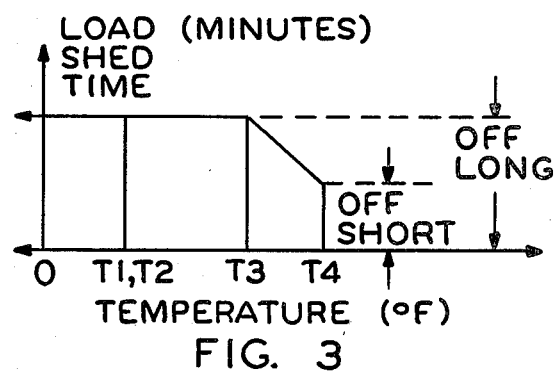

FIG. 3 details a desired scheme for use in refrigeration applications. If equal values are selected for T1 and T2 as indicated, the program provides that the OFF LONG time is maintained for all temperatures $Tx \leq T1$, rather than zero minutes off time as shown in FIG. 2. The converse case, i.e., a positive slope between T1 and T2 and OFF LONG for temperatures $Tx \leq T4$, is also provided for heating applications. If $T1 = T2$ and $T3 = T4$, the connected load will be operated at a fixed duty cycle regardless of temperature.

Figure 4:
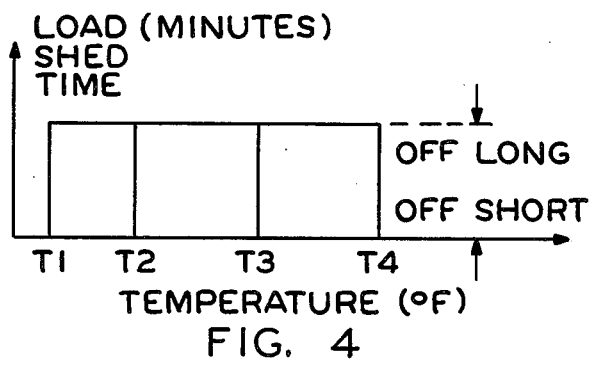

The scheme detailed in FIG. 4 is one that allows the user to program a fixed duty cycle over a temperature range. In that case where equal OFF LONG and OFF SHORT values are selected, the load is on continuously at sensed temperatures below T1 and above T4, and operates on a fixed duty cycle at sensed temperatures between T1 and T4.

Figure 5:
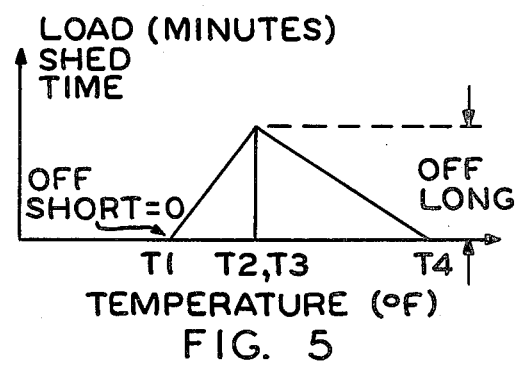

FIG. 5 shows a user programmed duty cycle that ramps from OFF SHORT to OFF LONG and back to OFF SHORT. The sketch shown is for OFF SHORT programmed=0, but it can be seen that FIG. 2 with $T2 = T3$ will achieve the same pattern except that it will have a non-zero OFF SHORT time associated with it.

Figure 6:
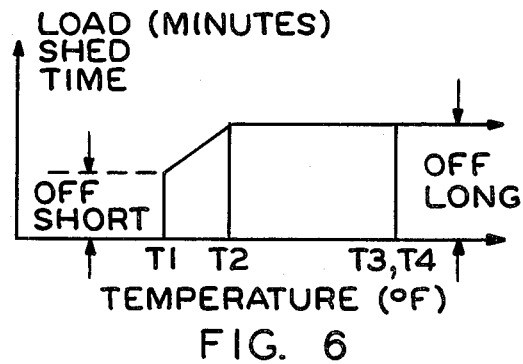

FIG. 6 is similar to FIG. 3, but illustrates a scheme for heating applications. IF $T3 = T4$ as indicated, for input $Tx \geq T4$, rather than a zero minutes off time as shown in FIG. 2, the OFF LONG time is maintained for all temperatures $Tx \geq T4$.

Figure 7:
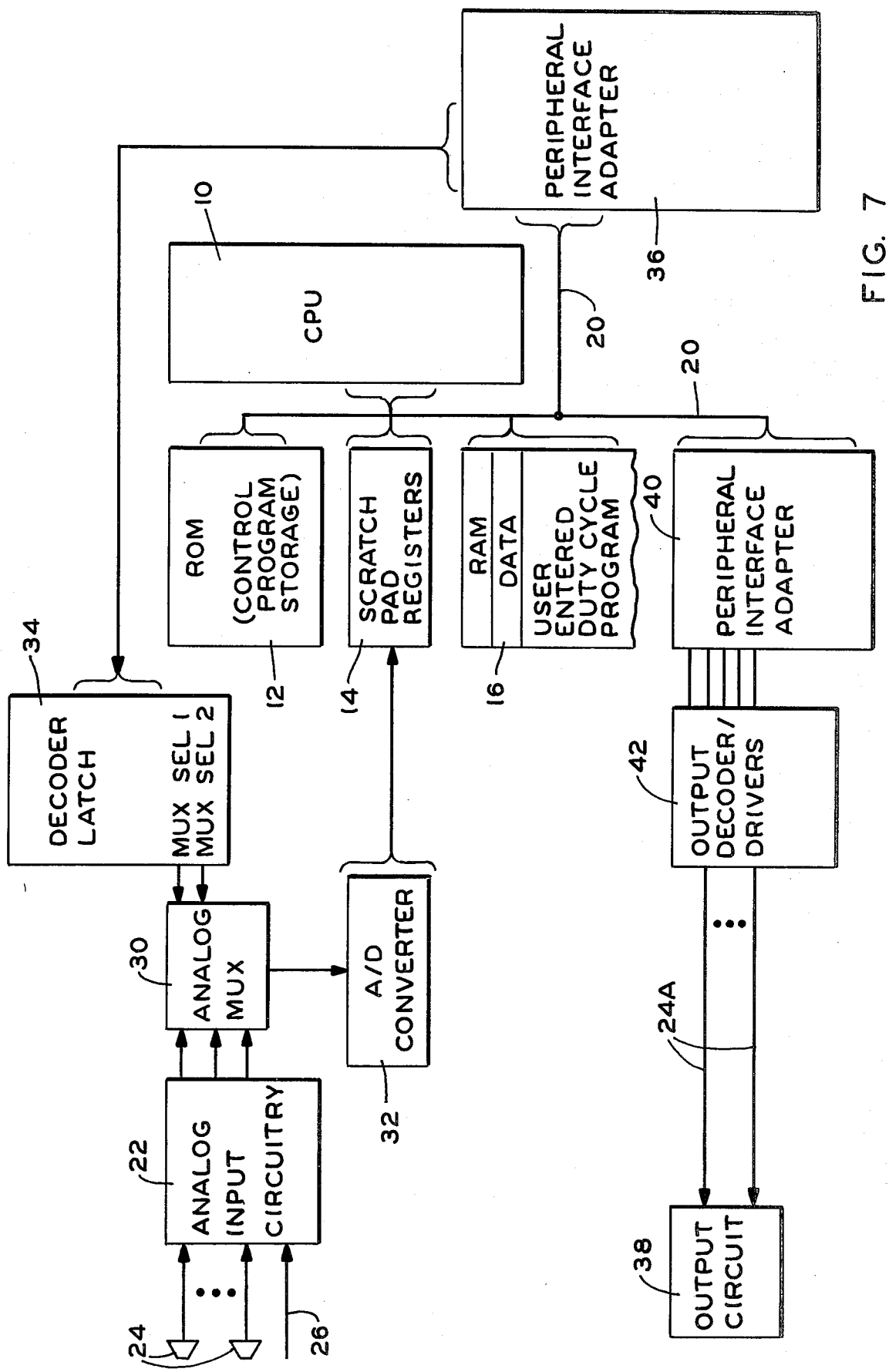
FIG. 7 shows computer apparatus for utilizing the duty cycling scheme of the invention.

Computer apparatus for utilizing the SHDTYM scheme of the invention for controlling heating and cooling equipment is shown in FIG. 7. The computer apparatus comprises conventional parts which include a central processing unit 10, a ROM 12 for control storage, scratch pad registers 14, a RAM 16 for data and user program storage, and peripheral interface adapters 36 and 40.

The above computer components are conventionally connected by data, address and control buses 20 as indicated.

An analog input circuitry interface 22 is provided for connection to a group or plurality of solid state temperature sensors 24 having output currents proportional to sensed temperatures, which may be indoor or outdoor temperatures as desired. The interface 22 also has an input 26 for a power demand limit sensor.

The current is fed from sensors 24 to the analog input circuitry 22 and converted to a voltage level. The temperature inputs are sampled via a multiplexer 30 under processor control, and samples are converted to digital signals by an A/D converter 32 and passed on to a scratch pad register 14. In the scratch pad register the data is scaled and converted to temperature values by conversion routines. It is also checked for validity and is passed to the temperature data registers where it is used for control decisions. Each temperature sensor 24 has a dedicated memory location in RAM 16 where data is stored.

Multiplexer 30 sequentially scans all the analog inputs of interface 22 and directs the inputs from temperature sensors 24 and power demand limit input 26 to the A/D converter 32. The power demand limit signal maybe in digital form, and, if so, is selected by a decoder latch 34 and directed to peripheral interface adapter 36. The SHDTYM scheme per se of the present invention is primarily concerned with the inputs from temperature sensors 24, however, and the power demand limit signal applied to input 26 is not involved in the basic operation and theory thereof. The SHDTYM scheme relative to sensors 24 will be discussed first and the involvement of the demand limit and time of day features will be discussed further on herein.

An output circuit 38 is connected to the second peripheral interface adapter 40 via an output decoder unit 42. The output circuit 38 has lines 24A which may correspond on a respective one-to-one basis with the sensors 24. Each temperature sensor 24 thus controls and corresponds to a particular output or group of output lines 24A. Each output line 24A may be connected to a particular heating or cooling unit, or there may be both a heating and a cooling unit connected to a particular line 24A. In its simplest form the system might have only one sensor 24 and a single corresponding output line 24A.

The SHDTYM scheme in effect involves programming with respect to individual sensors for the respective use with particular loads or groups of loads, and thus closed loop control of duty cycling on a load by load basis is obtained. Referring to the duty cycle graph of FIG. 2, such a graph applies to a single sensor 24 and a corresponding output line to which is connected a combination heating and cooling unit, such as a heat pump. Each sensor 24 and corresponding output line 24A similarly operate according to a particular duty cycle graph. Individual output lines may optionally be connected to heating and/or cooling units as desired. Accordingly, each sensor/output line channel is programmed to provide a temperature/shed time locus suitable for operating the controlled heating and/or cooling unit according to the desired duty cycle schedule.

Referring further to the duty cycle graph of FIG. 2, a particular control program represented by such a graph would only involve one temperature sensor 24, and the multiplexer 30 would direct the sensed values from that particular sensor to the A/D converter 32 for processing. The data input to RAM 16, through a keyboard or some other means, would include a channel number corresponding to a particular sensor 24, a duty cycle period, OFF LONG and OFF SHORT periods, and the four benchmark control temperatures T1 to T4. The OFF SHORT time has a practical constraint as applied to refrigeration compressors of the type which carry the lubricating oil as a vapor in the refrigerant. A compressor of this type requires a minimum running time for the lubricating process thereof to be effective. Therefore, the OFF SHORT time selected must meet, and it is advisable for the programming instructions which accompany a system to require as a part of the programming that the OFF SHORT time for a compressor unit greater than some minimum time. A typical minimum time would be four minutes, for example.

The main duty cycle control program is entered into RAM 16 via a keyboard (not shown) or some remote communications module, and stored in random access memory (RAM) as one block. There are eight pieces of information stored for each duty cycle control load channel as indicated above. Thus, the user may program an independent duty cycle control program for each load. Also each control program can be based on temperature information gathered from a separate sensor assigned to each channel. This permits the user extended flexibility in control strategies because control can be based on individual zone temperatures.

As indicated, the DUTYCYC program calculates OFFTIME (Tx) periodically for each load programmed for duty cycle control, and restores duty cycle controlled loads on output load lines 24A via status registers. In a system which has a number of loads there are certain savings which can be realized by balancing or distributing the shed times more or less uniformly. By so doing an optimum or nearly optimum number of loads will be on the main service line at any given time, rather than having few or no loads on at some times and all or almost all loads on at other times.

PREDIK is a scheme for balancing the shed times determined by SHDTYM. As an example of the operation of PREDIK assume that there are five loads controlled by a system, that the duty cycle period is ten minutes, and that the user programs and sensed temperatures are such that each load is to be shed for five minutes out of ten. The shed time percentage of each load would be fifty percent and the ideal number of loads shed at any time would be $5 \times \frac{1}{2}$ or 2.5 loads. As fractional loads cannot be shed, the desired number of loads shed at any one time would be either two or three loads.

At start up time the main duty cycle program DUTCYC via the SHDTYM routine determines current off times for all the loads in the system based on the temperatures sensed by the respective sensors. The PREDIK routine makes two passes every thirty seconds with the first pass operating to turn on loads and the second pass operating to shed loads. The first determines from status registers the loads for which the DUTCYC program is active the current shed time for each load, the shed time percentage for each load and the optimum number of loads to be shed at that time as explained above. If the optimum number initially involves an integer plus a fraction such as 2.5, the PREDIK routine will shed two loads (e.g., load #1 and #2), and (1) store 0.5 in memory as a fractional load and (2) make note in a register that load #3 is the next load to be shed. At the next pair of passes an additional 0.5 is added to the stored 0.5, and a third load (e.g., load #3) is shed. Thereafter until the five minute off time of loads #1 and #2 times out, the three loads actually shed satifsy the alternately calculated requirement that either 2.5 or 3.0 loads be shed. Assuming that none of the loads are turned off by time of day (TOD) controls, or by detection of a duly cycling failure, no changes will be made by PREDIK until the eleventh pass after five minutes when the shed times for loads #1 and #2 expire.

The first pass by PREDIK at the fifth minute again determines the loads for which the DUTCYC program is active, the current shed time for each load, the shed time percentage for each load and the optimum number of loads to be shed at that time. In this example the optimum number will again be 2.5 loads, loads #1 and #2 will be turned on, load #4 will be shed to bring the current number of shed loads to two (loads #3 and #4), and 0.5 will be stored. At the next pair of passes the 0.5 fraction will be added to the 0.5 load notation stored from the previous pair of passes will be added to indicate 3.0 load to be shed. At this time the shed time for load #3 times out and PREDIK determines that the next load to be shed are loads #5 and #1. However, the five minute on time for load #1 has not expired. Therefore, only loads #4 and #5 remain shed.

From the above explanation it may be noted that the PREDIK passes do not bring about any changes except upon the sensing of the occurrence of the expiration of one or more shed times or load operating times. The DUTYCYC program described above, which has the SHDTYM and PREDIK routines, will normally be utilized in conjunction with two other programs which provide power demand limit (PDL) and time of day controls.

The power demand limit, involves setting a maximum power usage target level for a heating and cooling system, and monitoring the power line to the system to determine the current power level. By way of example the power limit level might be 500 KW. The PDL program, which is entered into RAM 16 would utilizes the power demand limit signal on input 26. When the limit is exceeded the PDL program normally operates to sequentially shed loads controlled by the system to bring the actual power usage below the demand limit. Individual loads might be shed for a fixed period of time such as five minutes, for example, and the program would loads shed sequentially to provide even wear.

The time of day program is similarly entered into RAM 16 via the system keyboard (not shown) or a remote communication module, simply effects the shedding of predetermined loads at predetermined times.

On the first pass of each pair of passes PDL and TOD status registers are checked to determine which loads if any have been shed via the PDL and TOD programs which have priority relative to DUTYCYC. A count is kept of the number of loads shed for use by PREDIK in the second pass. On the first pass each load for which the shed time has expired is turned on and (1) a DUTYCYC ON period timer is set with the determination made by SHDTYM and (2) PDL ON period timer is set with a time in accordance with the PDL program. The PDL ON timer is set with the smaller of the calculated SHDTYM ON time or the programmed PDL ON time to insure that a load controlled by DUTYCYC will be available for PDL shedding as soon as possible under peak demand conditions. In the case of a compressor, however, the PDL ON period timer may not be set with a time less than the minimum run time required for the proper lubrication of the compressor as mentioned above.

After all loads are checked for current status the DUTYCYC failure flags are checked. If a failure is found all duty cycle loads are restored and no further duty cycle action is taken.

Still in connection with the first pass, DUTYCYC calls PREDIK to calculate the number of loads that should be shed. As indicated above this routine calculates the number of loads to be shed under duty cycle control based on the overall shed percentage of all duty cycle programmed loads. In addition, this routine features the self-correcting operation to ensure that calculation error does not reduce the effectiveness of system operation.

After the number of loads to be shed is calculated, a check is made to see if a start-up condition exists. A start-up condition exists when the system is energized or when the system is in the PDL routine. If a start-up condition does exist, the PREDIK routine allows the number of loads that can be turned off to be done incrementally (time-wise) to avoid erratic operation in which several loads might be shed in one minute and restored the next minute. If the start-up condition is not present, the number of loads to be shed is allowed to change dynamically to match controlled load conditions.

In the shedding sequence the last load shed under duty cycle control is determined, and a search is made of current status to see if the number of loads currently shed by the PDL and DUTCYC routines satisfies the calculated number of loads to be shed. If so, the PREDIK routine is exited. If not, the next load in the rotation is checked for shed availability and, if it is available, it is shed. By rotating through all loads, the system ensures that all controlled loads will be shed periodically.

The duty cycler control system disclosed herein is responsive to environmental temperatures and is operative to control heating and cooling equipment pursuant to the magnitude of such temperatures. The concepts involved in the disclosed invention are sufficiently broad, however, that they can likewise be utilized for analogous systems which would be responsive to other stimuli such as pressure and be operative to control appropriate kinds of equipment in response to changing values of such stimuli.

The embodiments of the invention in which an exclusive property or right is claimed are defined as follows:

1. A temperature controlling system for a temperature modifying unit for controlling the temperature in an enclosed space, said system comprising duty cycle control means having input and output means, sensor means for placement at a reference place for sensing a reference temperature at said place, said sensor means being connected to said input means of said control means, said duty cycle control means having a duty cycle off time locus responsive to said sensed reference temperature, said locus comprising first, second, third, and fourth selected benchmark temperatures and first and second selected duty cycle off times, said first and second benchmark temperature being no greater than said second benchmark temperature which is no greater than said third benchmark temperature which is no greater than said fourth benchmark temperature, said first off time being no longer than said second off time, said first off time being the off time at said first and fourth benchmark temperatures provided that said first and fourth benchmark temperatures are smaller and greater respectively than said second and third benchmark temperatures, and said second off time being uniform between said second and third benchmark temperatures, said duty cycle control means having output means corresponding to said input means thereof connectable to said unit.

2. A temperature controlling system according to claim 1 for a cooling unit wherein if said first and second benchmark temperatures are substantially equal, said second off time is maintained for sensed temperatures smaller than said first benchmark temperature.

3. A temperature controlling system according to claim 1 for a heating and cooling unit wherein selection of substantially equal first and second duty cycle off times provides a fixed duty cycle off time over the temperature range from said first benchmark temperature to said fourth benchmark temperature.

4. A temperature controlling system according to claim 1 wherein said second and third benchmark temperatures are substantially equal.

5. A temperature controlling system according to claim 1 wherein selection of substantially equal first and second benchmark temperatures and substantially equal third and fourth benchmark temperatures results in a constant off time for all sensed temperatures.

6. A temperature controlling system according to claim 1 for a heating unit wherein if said third and fourth benchmark temperatures are substantially equal, said second off time is maintained for sensed temperatures greater than said fourth benchmark tempeature.

* * * * *